United States Patent
Hatamizadeh

(10) Patent No.: US 12,533,453 B2
(45) Date of Patent: Jan. 27, 2026

(54) RENAL REPLACEMENT THERAPY MACHINE

(71) Applicant: UNIVERSITY OF FLORIDA RESEARCH FOUNDATION, INCORPORATED, Gainesville, FL (US)

(72) Inventor: Parta Hatamizadeh, Gainesville, FL (US)

(73) Assignee: UNIVERSITY OF FLORIDA RESEARCH FOUNDATION, INCORPORATED, Gainesville, FL (US)

( * ) Notice: Subject to any disclaimer, the term of this patent is extended or adjusted under 35 U.S.C. 154(b) by 767 days.

(21) Appl. No.: 17/787,488

(22) PCT Filed: Dec. 21, 2020

(86) PCT No.: PCT/US2020/066453
§ 371 (c)(1),
(2) Date: Jun. 20, 2022

(87) PCT Pub. No.: WO2021/127649
PCT Pub. Date: Jun. 24, 2021

(65) Prior Publication Data
US 2023/0034886 A1  Feb. 2, 2023

Related U.S. Application Data

(60) Provisional application No. 63/060,853, filed on Aug. 4, 2020, provisional application No. 62/951,854, filed on Dec. 20, 2019.

(51) Int. Cl.
*A61M 1/36* (2006.01)
*A61M 1/34* (2006.01)

(52) U.S. Cl.
CPC ........ *A61M 1/3623* (2022.05); *A61M 1/3434* (2014.02); *A61M 1/3612* (2014.02);
(Continued)

(58) Field of Classification Search
CPC .............. A61M 1/3434; A61M 1/3612; A61M 1/3623; A61M 1/3672; A61M 1/369;
(Continued)

(56) References Cited

U.S. PATENT DOCUMENTS

2005/0020958 A1  1/2005 Paolini et al.
2005/0203493 A1  9/2005 Kuroda et al.
(Continued)

FOREIGN PATENT DOCUMENTS

WO  2018045102 A1  3/2018

OTHER PUBLICATIONS

PCT/US2020/066453, PCT search report & written opinion mailed May 25, 2021, 18 pages.

*Primary Examiner* — John Kim
(74) *Attorney, Agent, or Firm* — Timothy H. Van Dyke; Wolter Van Dyke Davis, PLLC

(57) ABSTRACT

A renal replacement apparatus (100), having a hemofilter (108); an extracorporeal blood circuit (102) configured to communicate blood from a patient (104), through the hemofilter, and back to the patient; and a flow measuring device (150) configured to measure at least one blood flow property as the blood is leaving the hemofilter and before the blood returns to the patient at a flow measuring device location (152), wherein the flow measuring device comprises at least one of a viscometer and a rheometer. Alternately, or in addition, the renal replacement apparatus may include thermomodulator system (222) including at least one thermomodulator configured to selectively heat and cool the blood in the extracorporeal blood circuit. The renal replacement
(Continued)

apparatus (100) may have a controller (160). The controller may use artificial intelligence. Other embodiments are described herein.

15 Claims, 3 Drawing Sheets

(52) U.S. Cl.
CPC .......... *A61M 1/3672* (2013.01); *A61M 1/369* (2013.01); *A61M 2205/3331* (2013.01); *A61M 2205/3368* (2013.01); *A61M 2205/36* (2013.01); *A61M 2205/3606* (2013.01)

(58) Field of Classification Search
CPC .. A61M 2205/3331; A61M 2205/3368; A61M 2205/36; A61M 2205/3606
See application file for complete search history.

(56) References Cited

U.S. PATENT DOCUMENTS

| | | |
|---|---|---|
| 2005/0209547 A1 | 9/2005 | Burbank et al. |
| 2008/0015494 A1 | 1/2008 | Santini, Jr. et al. |
| 2011/0168614 A1 | 7/2011 | Pouchoulin et al. |
| 2016/0038666 A1 | 2/2016 | Kelly et al. |
| 2018/0369471 A1 | 12/2018 | Spickermann |

RENAL REPLACEMENT THERAPY MACHINE

FIELD OF THE INVENTION

The invention relates to an improved renal replacement therapy machine.

BACKGROUND OF THE INVENTION

Renal replacement therapy (RRT) is a therapy that functions as a substitute for some of the functions provided by a kidney, including solute clearance, electrolyte and acid-base adjustments and fluid removal. Renal failure can occur in acute and chronic forms and RRT may become necessary in either case. The RRT can be continuous (CRRT) or intermittent (IRRT). In case of CRRT, which is used in the intensive care settings, the patient is continuously connected to a running machine, whose goal in the ideal situation is to operate uninterruptedly, or with minimal interruption that is limited to special situations such as when the patients should be moved from the ICU room for certain procedures. CRRT machines use one of three modalities, i.e. hemodialysis or hemofiltration, or a combination of both, which is called hemodiafiltration.

In hemodialysis, blood is passed through a hemofilter (also called dialyzer), in which solutes such as toxins and wastes diffuse through a semipermeable membrane from the blood to a dialysis fluid. In hemofiltration, blood is passed through the hemofilter where water in the blood is driven across a semipermeable membrane by convection resulting from a pressure difference across the semipermeable membrane. The water takes with it solutes that are entrained in the water. When hemofiltration is used, the filtered fluid should be replaced by "replacement fluid", which can be given either before the hemofilter (pre-filter replacement) or after the hemofilter (post-filter fluid replacement). Hemodiafiltration is a process that combines both hemodialysis and hemofiltration.

One of the major challenges of RRT is the maintenance of the patency of a circuit that carries blood from the patient to the RRT machine, through the dialyzer (hemofilter), and back to the patient. Clot formation within this extracorporeal circuit, (e.g. the dialysis cartridge, the hemofilter, and the tubing of RRT) is a common obstacle. This results in several untoward effects, including: A) loss of a patient's blood; B) significant financial burden due to (i) a need for premature replacement of the dialysis cartridge, the hemofilter, and the tubing, and (ii) a need for additional time and manpower for this exchange; and C) longer circuit downtime which, in turn, leads to decreased effectiveness of the renal replacement therapy.

Currently the attempt to decrease the likelihood of hemofilter clotting and malfunction is mainly accomplished by application of regional or systemic anticoagulation, application of hemodialysis or hemodiafiltration instead of hemofiltration, using pre-filter fluid replacement rather than post filter replacement when hemofiltration or hemodiafiltration is used, and adjustment of filtration fraction (the fraction of plasma water that is removed by the hemofilter). Although these adjustments can be helpful, there are significant limitations. For instance, use of anticoagulation is costly, can increase the risk of bleeding, and/or imposes a risk of citrate toxicity. Application of pre-filter fluid replacement decreases the efficiency of the clearance of toxins, and adjustment of filtration fraction is an inaccurate method. In fact, filtration fraction is a surrogate for end-filter hematocrit, which is the ratio of the volume of red blood cells to the total volume of blood. In addition to filtration fraction, the end-filter hematocrit is impacted by other factors that are overlooked in this approach. Furthermore, hematocrit itself is one out of many blood properties and other factors that affect the extracorporeal blood circuit function and risk of blood clot formation. Moreover, hematocrit alters over time throughout the process of renal replacement therapy. This suggests the need for a continuous adjustment of ultrafiltration rate and other RRT parameters, which is not feasible to perform with current methods.

Accordingly, there remains room in the art for improvement.

SUMMARY OF THE INVENTION

An embodiment of the invention includes a renal replacement apparatus, having: a hemofilter; an extracorporeal blood circuit configured to communicate blood from the patient, through the hemofilter, and back to the patient; and a flow measuring device configured to measure at least one blood flow property as the blood is leaving the hemofilter and before the blood returns to the patient at a flow measuring device location. The flow measuring device includes at least one of a viscometer and a rheometer.

In certain embodiments, the RRT apparatus further includes a controller in data communication with the flow measuring device and/or with at least one data input device and/or with at least one operator input interface. The controller can be configured to monitor the measured at least one blood flow property and to adjust at least one parameter of the renal replacement apparatus in response to the measured at least one blood flow property and/or in response to at least one parameter communicated by data input device and/or in response to at least one parameter communicated by operator input interface; or adjust at least one parameter of at least one Ancillary Medical Device in communication with the controller, or a combination thereof.

In a specific embodiment, the controller is programmed to conduct one or more algorithms to determine adjustments of the at least one parameter for maintaining at least one of the patency, treatment adequacy (i.e., clearance dose adequacy, electrolyte and acid-base adjustment adequacy and fluid removal adequacy), and patient safety. In another specific embodiment, the controller utilizes artificial intelligence to determine the adjustments. For example, artificial intelligence can become trained about an impact of administered changes to the at least one blood flow parameter and/or at least one parameter of at least one ancillary medical device on the at least one of patency, treatment adequacy, and patient safety in a particular patient in a particular clinical scenario, and to adjust future modifications of at least one blood flow CRRT machine parameter and/or at least one parameter of at least one ancillary medical device accordingly.

Another embodiment of the invention includes a method, including: performing a renal replacement therapy by passing blood in the extracorporeal blood circuit through a hemofilter that performs at least one of hemodialysis and hemofiltration; measuring at least one blood flow property at a downstream end of the hemofilter via the flow measuring device, wherein the flow measuring device includes at least one of the viscometer and the rheometer; monitoring the measured at least one blood flow property via the controller; and controlling at least one parameter of the renal replacement therapy in response to the measured at least one blood flow property.

Another embodiment of the invention includes a renal replacement apparatus, including: a hemofilter; an extracorporeal blood circuit configured to communicate blood from a patient, through the hemofilter, and back to the patient; and a thermomodulator system including at least one thermomodulator configured to measure a temperature of blood and to heat the blood in a heating mode and to cool the blood in a cooling mode. Another embodiment of the invention includes a method, including: performing a renal replacement therapy by passing blood in an extracorporeal blood circuit through a hemofilter that performs at least one of hemodialysis and hemofiltration; measuring at least one blood flow property via a flow measuring device; monitoring the measured at least one blood flow property; and adjusting a temperature of the blood in response to the measured at least one blood flow property using at least one thermomodulator. The at least one thermomodulator is configured to heat the blood in response to a first state that is based, at least in part, on the at least one blood flow property, and to cool the blood in response to a second state that is based, at least in part, on the at least one blood flow property.

In another embodiment, the RRT apparatus may include at least one blood sampler, and at least one blood analyzer in fluid communication with the at least one blood sampler. The at least one blood analyzer typically communicates data with the controller. In a specific embodiment, the controller is configured to adjust the frequency of sampling and analyzing the blood in response to information it receives from the analyzer, information it receives from the data input device, information it receives from the operator input interface and in response to the changes controller makes to the infusion rate of citrate.

BRIEF DESCRIPTION OF THE DRAWINGS

The invention is explained in the following description in view of the drawings that show.

DETAILED DESCRIPTION OF THE INVENTION

Blood viscosity is, by definition, a factor that impedes flow and causes blood circuit malfunction and clotting. The likelihood of clotting increases with both increased hematocrit and increased stagnation of the blood flow, which itself can be worsened by increased hematocrit. Hence, an increase in hematocrit is associated with an increased risk of clotting and an associated increased risk of blood circuit malfunction. However, end-filter (post dialysis and post hemofiltration) hematocrit is only one of the many factors that affect blood viscosity.

In one embodiment, the invention integrates a flow measuring device into an RRT machine so information about the flow of blood can be directly obtained, monitored, and used to continuously adjust the parameters of the renal replacement therapy. The flow measuring device is at least one of a viscometer and a rheometer. A viscometer is a device that can directly measure the viscosity of a fluid in any point in time. A rheometer is a device that measures the way in which a liquid, suspension, or slurry flows in response to applied forces. With this modification of the RRT machines, viscosity and/or rheological properties (hereafter collectively referred to as "at least one blood flow property") can be directly and constantly measured. In contrast, the prior art first estimates the end-filter hematocrit via the filtration fraction and then estimates blood viscosity according to the estimated hematocrit. Direct measurements reduce the possibility of inaccuracy associated with the calculated/estimated viscosity used in the prior art. The more accurate at least one blood flow property information will enable a more accurate prediction of the risk of dialysis cartridge malfunction, hemofilter malfunction, and blood circuit clotting at any point in time.

By adding some software to this design, the RRT machines can be programmed to continuously modify the filtration fraction and other parameters according to the real-time direct measurements of the at least one blood flow property to maintain an end-filter at least one blood flow property within an acceptable range. This in turn, will protect against blood circuit malfunction and clot formation. The programming can be according to preplanned models and/or can be flexible for the user to set the RRT machine according to the patient's conditions and individual clinical considerations. Moreover, the controller is equipped with an artificial intelligence system, which, as time passes, can be trained about each particular patient in each individual clinical condition, and further modify its algorithm to be able to maintain, within acceptable ranges, the parameters related to all three major targets 1) circuit patency 2) treatment adequacy (i.e., clearance dose adequacy, electrolyte and acid-base adjustment adequacy and fluid removal adequacy) 3) patient safety.

Figure 1:
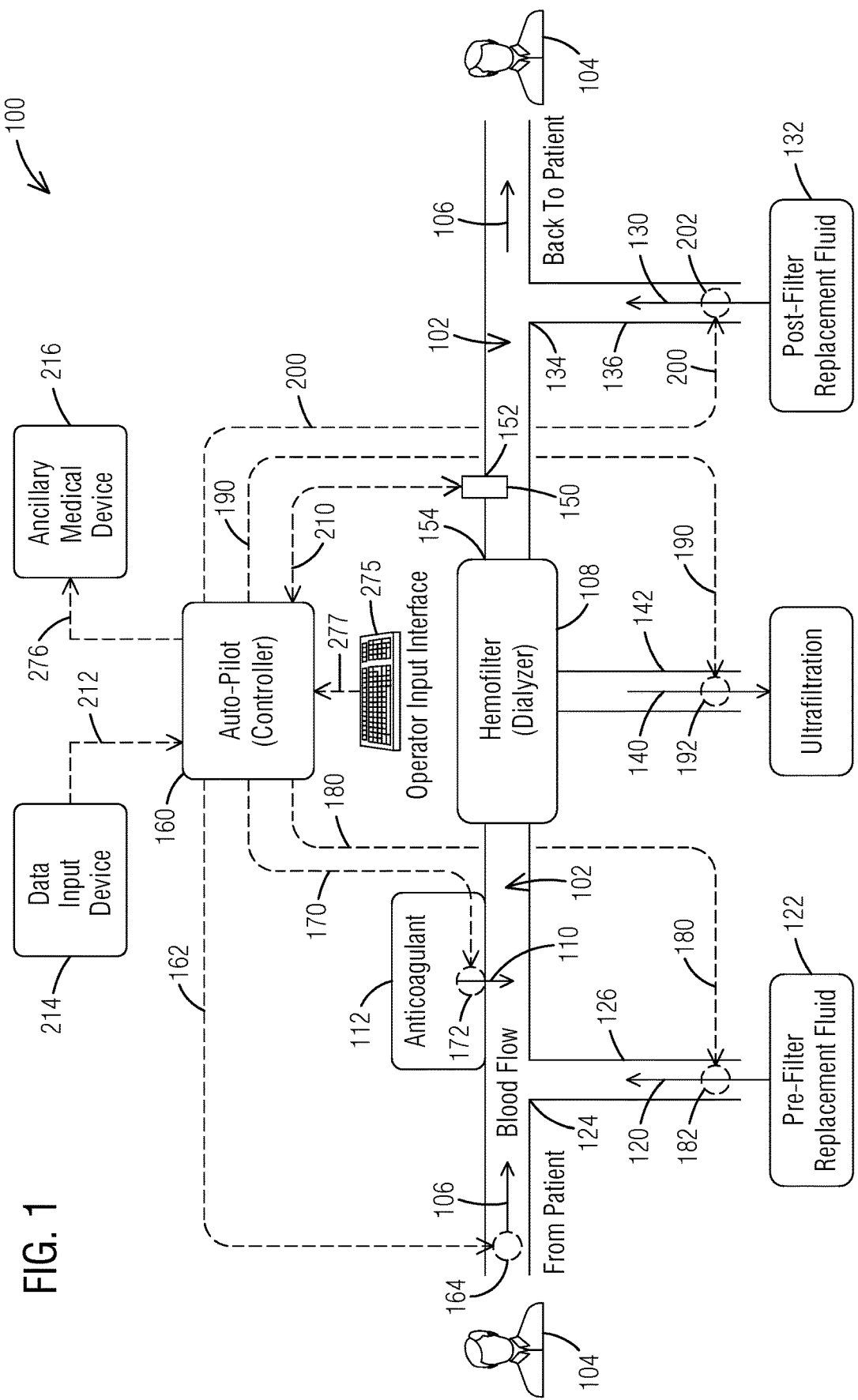
FIG. 1 is a schematic representation of an example embodiment of the improved RRT apparatus with a flow measuring device.

FIG. 1 shows an example embodiment where the flow measuring device is incorporated into a renal replacement apparatus 100. In the renal replacement apparatus 100, an extracorporeal blood circuit 102 communicates blood 106 from a patient 104, through a hemofilter 108, and back to the patient 104. (The hemofilter 108 is also known as a dialyzer but will be referred to herein as a hemofilter.) The flow measuring device could be incorporated into the RRT machine, whether it is used in hemofiltration mode, hemodialysis mode, or hemodiafiltration mode. It is noted that the term "RRT machine" is used interchangeably with renal replacement apparatus throughout.

Anticoagulant 110 may be supplied from an anticoagulant source 112 via an injector 172 to blood 106 leaving the patient 104 and enroute to the hemofilter 108. Pre-filter replacement fluid 120 may be supplied from a pre-filter replacement fluid source 122 to the blood 106 leaving the patient 104 and enroute to the hemofilter 108 at a pre-filter replacement fluid injection location 124 via a pre-filter replacement fluid conduit 126. Post-filter replacement fluid 130 may be supplied from a post-filter replacement fluid source 132 to blood 106 leaving the hemofilter 108 and enroute back to the patient 104 at a post-filter replacement fluid injection location 134 via a post-filter replacement fluid conduit 136. Ultrafiltration waste fluid 140 exits the hemofilter 108 via drain 142.

The flow measuring device 150 will take measurements at a flow measuring device location 152 which is, in an example embodiment, adjacent a downstream end 154 of the hemofilter 108. In an embodiment, the flow measuring device 150 will sense the at least one blood flow property leaving the downstream end 154 of the hemofilter 108 and approaching the post-filter replacement fluid injection location 134. In an alternate example embodiment, the flow measuring device 150 may be disposed within the hemofilter 108 at a downstream end of the hemofilter 108. Stated another way, the flow measuring device location 152 may be at the downstream end 154 of the hemofilter 108, whether before or after leaving the hemofilter 108.

In the example embodiment shown, the flow measuring device 150 is a single/integrated unit disposed at the flow measuring device location 152 and in data communication with the controller 160. However, there are at least three different configurations for the flow measuring device 150. In the first configuration, the flow measuring device is an integrated unit and disposed as part of the extracorporeal blood circuit at the flow measuring device location 152 as is shown in FIG. 1. In a second configuration, the flow measuring device includes a sampler placed at the flow measuring device location 152 which takes samples and sends the samples to separately located componentry of the flow measuring device. The separately located componentry generates the desired data and is in data communication with the controller 160. In a third configuration, a flow measuring device sensor itself is disposed in the extracorporeal blood circuit 102 at the flow measuring device location 152 and is in data communication with a separately located processor of the flow measuring device 150 which is, in turn, in data communication with the controller 160. In each of the above embodiments, the flow measuring device location 152 may be at the downstream end 154 of the hemofilter 108, whether before or after leaving the hemofilter 108.

In an example embodiment, the at least one blood flow property includes at least one of blood viscosity and other blood rheological properties. In the example embodiment shown, the flow measuring device 150 is an integrated device having a sensor and processor that transmit at least one blood flow property data to the controller 160.

The renal replacement apparatus 100 may further include a controller 160 (auto-pilot processor) in data communication 162 with components 164 (e.g. sensors, controllable pumps) associated with the blood 106 and its flow. The controller 160 may be in data communication 170 with components 172 (e.g. sensors, controllable pumps) associated with the anticoagulant 110 and its flow. The controller 160 may be in data communication 180 with components 182 (e.g. sensors, controllable pumps) associated with the pre-filter replacement fluid 120 and its flow. The controller 160 may be in data communication 190 with components 192 (e.g. sensors, controllable pumps) associated with the ultrafiltration fluid 140 and its flow. The controller 160 may be in data communication 200 with components 202 (e.g. sensors, controllable pumps) associated with the post-filter replacement fluid 130 and its flow. The controller 160 may be in data communication 210 with the flow measuring device 150. This communication 210 may be bi-directional such that the controller receives input concerning at least one blood flow property data and the controller 160 can communicate commands to the flow measuring device. The controller 160 may be in data communication 212 with at least one data input device 214. Various patient data may be communicated from the at least one data input device 214 to the controller 160 in accordance with the other teachings disclosed herein. Examples of the at least one data input device include, but are not limited to, sphygmomanometer, arterial or central venous pressure transducer, thermometer, blood gas analyzer, pulse oximeter, telemetry device, electrocardiogram, blood analyzer, ventilator, impedance monitor, scale, ultrasound machine, echocardiogram machine and CRIT-LINE® monitor manufactured by Fresenius Medical Care of North America and the like. Examples of patient data/patient parameters provided to the controller 160 from the at least one data input device 214 include but are not limited to: blood pressure, heart rate, respiratory rate, oxygen saturation, blood gas information, temperature, hematocrit levels, data from blood tests such as coagulability parameters, electrolytes and blood chemistry, electrocardiogram data, telemetry data, ventilator settings and parameters, impedance monitoring data, weight monitoring data, ultrasound and echocardiogram data, and data from a CRIT-LINE®.

The controller 160 may be in data communication 277 with the operator input interface 275. Various information, including patient data, operator commands, clinician's desired settings, etc. may be entered by the operator (nurse, clinician, etc.) through the operator input interface 275 and communicated to the controller 160. Examples of the operator input interface include, but are not limited to keyboard, mouse, microphone (along with a voice recognition system), touchpad, etc.

Furthermore, the controller 160 may be in communication 276 with at least one ancillary medical device 216. An ancillary medical device 216 is one that may be used during RRT treatment, and the controller 160 can make adjustments to the ancillary medical device 216 during or proximate to the RRT treatment. Examples of ancillary medical devices include, but are not limited to, IV infusion pumps, syringe pumps, a patient's bed, a ventilator and an extracorporeal membrane oxygenation (ECMO) machine.

Figure 2:
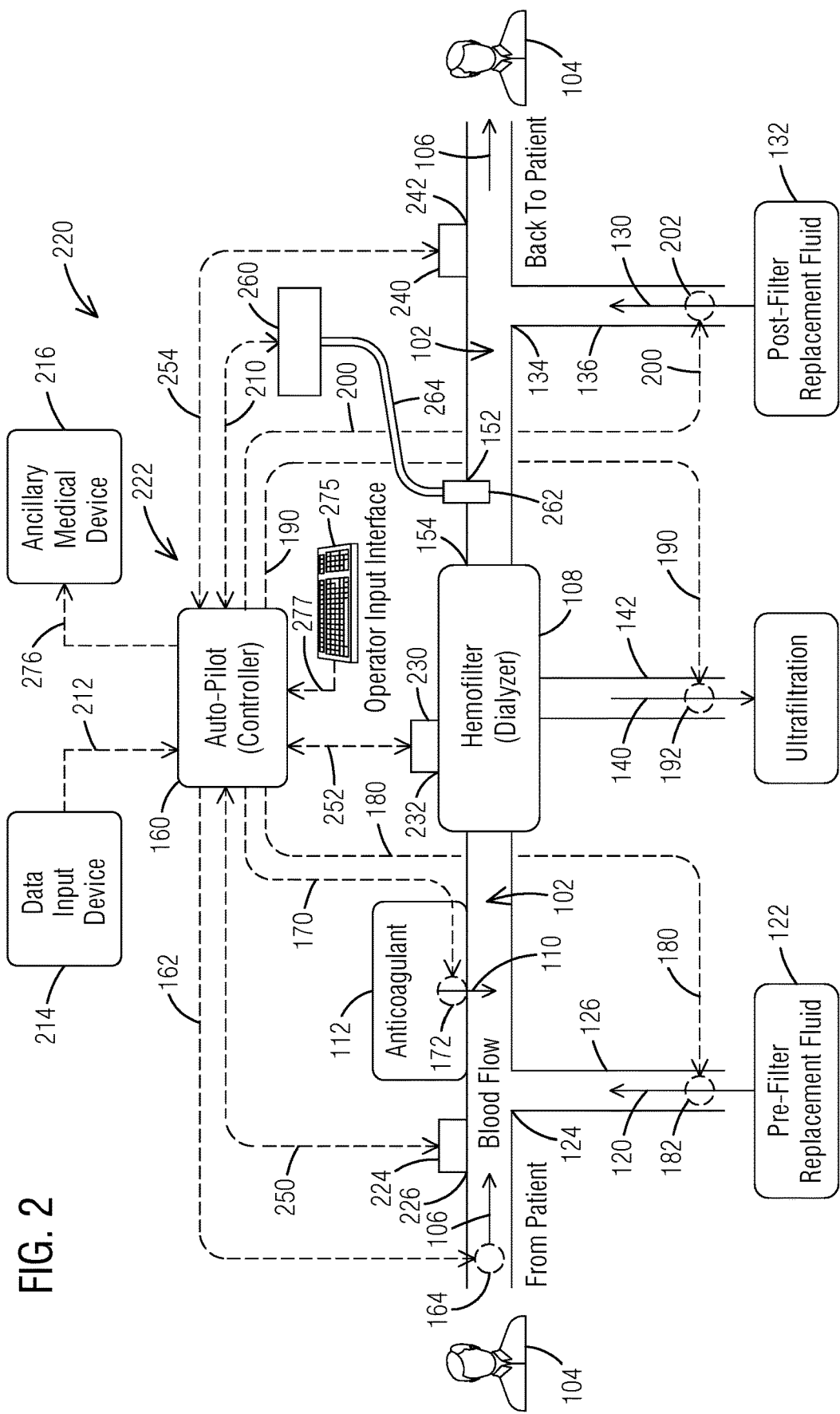
FIG. 2 is a schematic representation of an alternate example embodiment of the improved RRT apparatus with a flow measuring device and a thermomodulator system.
Figure 3:
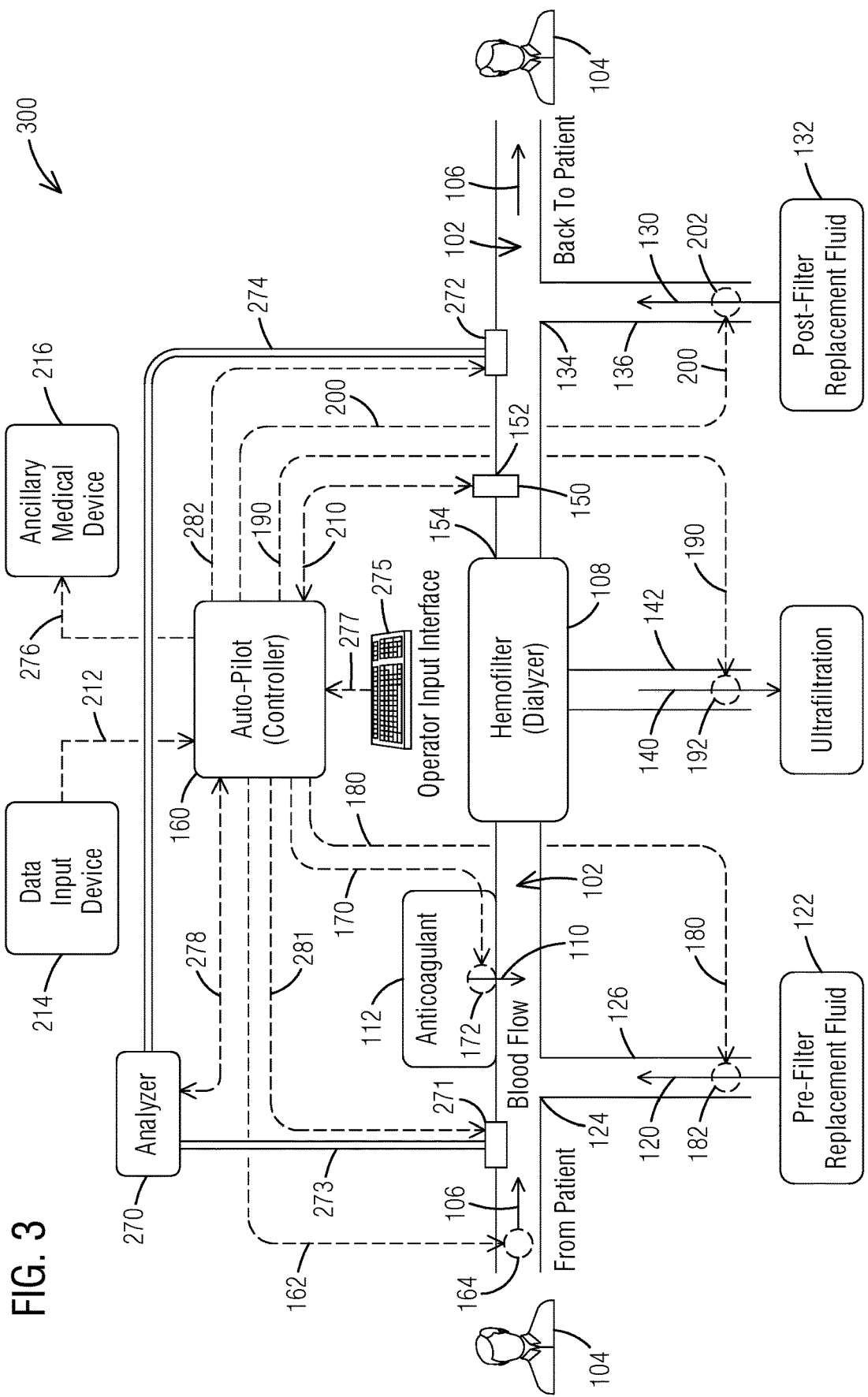
FIG. 3 is a schematic representation of an alternate example embodiment of the improved RRT apparatus with a blood sampling and analyzing system.

As shown in FIG. 3, the renal replacement apparatus 300 may be equipped with at least one blood sampler (two samplers 271 and 272 are shown) and a blood analyzer 270 such that the blood sampler can collect blood samples from different parts of the extracorporeal blood circuit and transfer it to the blood analyzer 270 to perform tests on the blood. The blood analyzer 270 and controller 160 are in data communication 278 with each other. The controller 160 is in data communication 281, 282 with blood samplers 271, 272, respectively. In the case of blood sampler 271, it can be placed in a location of the blood stream before any changes to the patient's blood has been made by the apparatus 300 to check patient's blood parameters and/or in the case of blood sampler 272, it can be placed elsewhere in the extracorporeal blood circuit to measure the changes that has been made to the blood up to that point. As an example, blood sampler 272 is placed somewhere after the citrate injection pump to transfer a blood sample to the blood analyzer, which then measures circuit ionized calcium and transfers this data 278 to the controller 160, which in turn can order necessary adjustments to citrate infusion rate, through controllers communication 170 to the anticoagulant injector 172. Similarly, based on patient's serum ionized calcium, measured by the analyzer 270 from the blood sample taken by the sampler 271, the controller 160 may make necessary modifications to the rate of calcium infusion through controller's communication 276 with an ancillary medical device 216, which in this case, would be a calcium infusion pump. Not to be limiting, the controller 160 can communicate command(s) to the blood samplers 271, 272 to direct when to sample and how much blood to sample. Likewise, the controller 260 communicates with the blood analyzer 270 to tell the analyzer when to measure and what to measure in sampled blood. It will be understood by those in the art that one, two or more samplers can be located at various locations of the extracorporeal circuit. The remaining components and connections shown in FIG. 3 are as described above for FIG. 1. It is also to be understood, that at least one sampler and at least one analyzer may be optionally implemented in the apparatus 220 shown in FIG. 2.

This arrangement provides feedback, intermittent or constant, regarding the end-of filter at least one blood flow property and regarding other information such as the information that comes from data input device 214 and/or the information that comes from operator input interface 275 (e.g. a keyboard, dials, buttons, mouse, microphone, touchpad, etc.) as shown in FIGS. 1-3, to the controller 160. Monitoring the feedback thereby enables the controller 160 to determine where the actual at least one blood flow property, the actual at least one safety parameter and the actual situation in regards to at least one adequacy parameter are with respect to a range of acceptable values that is either predetermined or set by an operator. This data will enable control of the RRT settings according to one of the apparatus' default protocols or according to an operator-defined custom protocol in order to ensure the at least one blood flow property remains within or returns to the range of acceptable values, while maintaining the patient safety parameters and the treatment adequacy measures, when applicable, within the acceptable ranges. The changes that the controller 160 can apply include change of ultrafiltration rate, initiation, alteration of the rate or termination of pre-filter replacement fluid, initiation, alteration of the rate, or termination of post-filter replacement fluid, modification of blood flow rate, initiation, dose adjustment, or cessation of regional or systemic anticoagulation, switching between modalities, adjusting a modality of the RRT machine, switching dialysate fluid and/or replacement fluid type and communication with an ancillary medical device 216 to adjust at least one device's at least one parameter.

CRRT machines use one of three modalities, i.e. hemodialysis, hemofiltration, or a combination of both, which is called hemodiafiltration. When in hemodiafiltration mode, adjusting the modality includes adjusting a percentage of hemodialysis and a percentage of hemofiltration in the overall process being performed. Dialysate fluids and replacement fluids may contain different concentrations of ingredients. In various circumstances, different types of dialysates or replacement fluids might be the best choice and this best choice for the dialysate or replacement fluid may change throughout the RRT process. Having the ability to set the parameters enables the clinician to also set a desired minimum clearance rate, a desired electrolyte and acid-base correction adequacy and a desired fluid removal rate, and let the controller 160 make the necessary changes to keep not only the viscosity and other hemorheological parameters within the desired limits, but also the treatment adequacy parameters, within certain ranges while the adjustments are done without compromising patient safety according to the safety-check parameters. The renal replacement apparatus can be programmed to conduct complex algorithms to achieve determinations and decisions based on the data received from one or multiple sources within the system and to adjust one or multiple parameters that are optimal for maintaining 1) extracorporeal circuit patency, 2) treatment adequacy and 3) patient safety (based on the data received and calculations conducted). A diverse variety of safety parameters can be introduced to the controller, including but not limited to, systolic blood pressure, diastolic blood pressure, mean arterial pressure, central venous pressure, pulmonary capillary wedge pressure, total body water data, intravascular volume data, heart rate, temperature, heart rhythm, oxygen saturation, blood gas parameters, electrocardiogram parameters, telemetry parameters, impedance monitoring parameters, ventilator settings and ventilator data, weight monitoring data, ultrasound and echocardiogram data, hematocrit, plasma electrolyte levels and other blood chemistry test results, coagulability indices (including serum ionized calcium level), CRIT-LINE® parameters, etc. As such, the renal replacement apparatus embodiments disclosed herein provide an RRT machine equipped with artificial intelligence.

By making these modifications to the RRT machine, the adverse effects of the treatment as well as the therapy costs will markedly decrease and at the same time, the efficiency of RRT will increase and patient safety will enhance. Thus, the expenses of applying such changes would be minimal compared to its financial and health benefits; hence, application of these modifications is justified.

An example method associated with the flow measuring device 150 includes: performing a renal replacement therapy by passing the blood 106 in the extracorporeal blood circuit 102 through the hemofilter 108 that performs at least one of hemodialysis and hemofiltration; measuring at least one blood flow property of blood 106 via the flow measuring device 150, after the blood 106 has been passed through the hemofilter 108 and before the blood 106 has returned to the patient 104, wherein the flow measuring device 150 includes at least one of the viscometer and the rheometer; monitoring the measured at least one blood flow property via the controller 160; and controlling at least one parameter of the renal replacement therapy in response to the measured at least one blood flow property.

In the example method, the at least one blood flow property of blood 106 is measured after the blood 106 has been passed through the hemofilter 108 and before the blood 106 has returned to the patient 104. In an example method, the flow measuring device 150 includes the viscometer and the at least one blood flow property comprises a viscosity of the blood 106. In another example method, the flow measuring device 150 comprises the rheometer. In the example method, the at least one parameter comprises any of: an ultrafiltration rate; initiation, alteration of the rate, or termination of pre-filter replacement fluid; initiation, alteration of rate, or termination of post-filter replacement fluid; a modification of blood flow rate; an initiation, dose adjustment, or cessation of anticoagulation, switching between modalities and adjusting a modality of the RRT machine, switching between different types of dialysate fluid and/or replacement fluid and communication with an ancillary medical device 216 to adjust at least one device's at least one parameter.

In any embodiment, the renal replacement apparatus 100, 220 or 300 may include an alarm system. For example, when the controller 160 makes a change to a potentially sensitive parameter of the renal replacement therapy parameters, such as initiation, dose adjustment or cessation of anticoagulation, or changing a dialysate fluid or replacement fluid, the controller can also be set to generate an alarm to inform an operator of the change to the potentially sensitive parameter. The alarm system may include an output component (e.g. speaker, light, buzzer, bell, and the like) to convey the alarm to the user. In an example of increasing the rate of citrate infusion as an adjustment of regional anticoagulation dose, the user (e.g. an ICU nurse) will be alarmed to be able to adjust frequency of serum ionized calcium measurements and when necessary, to adjust calcium infusion rate accordingly. Of note, the calcium infusion pump itself, can be connected to and controlled by the RRT machine's controller, so that this step can also be assisted by the RRT controller. Similarly, changing the frequency of serum ionized calcium measurement can be performed by the built-in sampler and analyzer system, if the CRRT machine is equipped with that option as in FIG. 3. Nevertheless, the alarm system will still be helpful to inform the operator, even if the controller has been set to automatically adjust the calcium infusion rate and the frequency of the serum ionized calcium measurements. In another example, the controller 160 can be set to alarm the operator in such conditions that a change in a sensitive parameter such as an anticoagulation infusion is necessary and make the planned change only after the operator's approval, or make changes according to the operator's modifications to that plan. In an example of systemic anticoagulation, the controller 160 can alarm the operator and recommend changes to the systemic anticoagulation dose based on the readings of the at least one blood flow property data by the flow measuring device. The operator may then decide to change the infusion rate of a systemic anticoagulation treatment if there is no clinical contraindication and to monitor the results of that change, which will be detected by the flow measuring device. In another example of systemic anticoagulation, the controller 160 may be in data communication with a heparin pump (as an ancillary medical device) and thereby, may make the modifications directly, while alarming the operator.

FIG. 2 is a schematic representation of an alternate example embodiment of the improved RRT apparatus with a flow measuring device and a thermomodulator system. The example embodiment of FIG. 2 is similar to that of FIG. 1. In the example embodiment of FIG. 2, the renal replacement therapy machine 220 additionally includes a thermomodulator system 222. Although the example embodiment of FIG. 2 additionally includes both the flow measuring device and the thermomodulator system 222, in other embodiments the renal replacement therapy machine may alternately only include the flow measuring device or the thermomodulator system 222. Where the elements of the example embodiment of FIG. 1 and FIG. 2 are the same, the same identifiers have been used. The thermomodulator system 222 is configured to measure (constantly or intermittently) a temperature of the blood 106 within the extracorporeal blood circuit 102, and to report the temperature to the controller 160, and/or to adjust the temperature of the blood as desired. The thermomodulator system 222 provides an ability to modify the at least one blood flow property (e.g. viscosity) to maintain the patency of the extracorporeal blood circuit 102 and prevent clotting by selectively controlling/adjusting the temperature at one or more points in the extracorporeal blood circuit 102.

The thermomodulator system 222 may include one or more thermomodulators. Each thermomodulator is configured so that the thermomodulator can sense a temperature of a fluid, can heat the fluid in a heating mode, and can cool the fluid in a cooling mode. In an example embodiment, the fluid is the blood 106. However, the fluid can alternately be pre-filter replacement fluid, post-filter replacement fluid, dialysate, anticoagulant, or any fluid associated with the renal replacement apparatus. In this sense, warming or cooling the replacement fluid or anticoagulant is a means of changing the temperature of the blood within the extracorporeal circuit. Accordingly, the one or more thermomodulators can be around the blood tubing or filter to directly change the blood temperature or positioned at a location so as to make the replacement fluid or dialysate or anticoagulant warm or cold, for purposes of indirectly changing the blood's temperature.

The thermomodulator system 222 may include a prefilter thermomodulator 224 disposed at a prefilter thermomodulator location 226 in the extracorporeal blood circuit 102 downstream of the patient 104 and upstream of the hemofilter 108. The thermomodulator system 222 may include a hemofilter thermomodulator 230 disposed at a hemofilter thermomodulator location 232 in the extracorporeal blood circuit 102 that is within the hemofilter 108. The thermomodulator system 222 may also include a postfilter thermomodulator 240 disposed at a postfilter thermomodulator location 242 in the extracorporeal blood circuit 102 downstream of the hemofilter 108 and upstream of the patient 104. In addition, the thermomodulator system 222 may include a thermomodulator in any location where there is any fluid associated with the extracorporeal blood circuit 102. For example, there may be a thermomodulator for thermoregulation of the pre-filter replacement fluid, there may be a thermomodulator for thermoregulation of the post-filter replacement fluid, there may be a thermomodulator for thermomodulation of the dialysate, and there may be a thermomodulator for thermoregulation of the anticoagulant fluid. In these cases, changing the temperature of the replacement fluids or the anticoagulant, before they are mixed with blood, or changing the temperature of the dialysate before it is run against the blood across the semipermeable membrane is a means of changing the temperature of the blood itself.

As such, by cooling or heating the pre-filter replacement fluid, post-filter replacement fluid, dialysate and/or the anticoagulant, the thermomodulator system 222 can adjust the circuit temperature in any given location throughout the extracorporeal circuit. The thermomodulator system 222 may include one or more of the thermomodulators disclosed above, more thermomodulators than disclosed above, and any combination of thermomodulators. A thermomodulator may be of any type known to the artisan and suitable for this application. Examples include heat exchangers, heat pumps, resistance heaters, etc. The temperature sensing function of the thermodulators can occur at the same location as the heating and cooling functions. Alternately, the temperature sensing function of the thermodulators can occur at a different location than the location where the heating and cooling functions occur. In other words, the parts associated with thermoregulation (heating and cooling) may be in the same device as the parts associated with temperature measuring. Alternately, the parts associated with thermoregulation (heating and cooling) may be physically separated and independently positionable relative to the parts associated with temperature measuring. The thermomodulators in FIG. 2 show the thermoregulation and temperature measuring parts are in the same location, but this is not required.

Each thermomodulator may be capable of selectively increasing and decreasing the temperature of the blood passing therethrough. In a first example embodiment, blood 106 leaving the patient is heated in the prefilter thermomodulator 224 to a target temperature. In the example embodiment, the temperature of the blood is cooled in the postfilter thermomodulator 240 to a temperature that is suitable for delivery to the patient 104. Heating decreases the viscosity but at the same time may impact the risk of clotting. This is because alteration of temperature may change coagulability of the blood. Therefore, there should be a balance between these two considerations.

In a second example embodiment, instead of being heated then cooled, the blood 106 leaving the patient is first cooled in the prefilter thermomodulator 224 to a target temperature. This may reduce the coagulability of the blood 106, thereby reducing the problems associated with clotting. In this second example embodiment, the blood is then heated in the postfilter thermomodulator 240 to a temperature that is suitable for delivery to the patient 104. A suitable temperature that provides the most desirable balance between the viscosity and coagulability to achieve optimal hemorheological properties of the extracorporeal blood circuit 102 may vary from patient to patient as well as from one set of clinical conditions to another. The suitable temperatures can be reached through feedback loop adjustments of this machine. Furthermore, the operator has the ability to set the machine according to the clinical conditions. For example, in the presence of a hyperviscosity condition and the absence of a hypercoagulable state, heating the blood may improve the flow, whereas in hypercoagulable conditions that are not associated with hyperviscosity of blood, cooling may help create a better circuit flow. The fact that the controller 160 can also adjust the other parameters at the same time creates further flexibility to have a better control on the situation by combining different strategies, such as warming the blood to decrease viscosity and at the same time, adding anticoagulation treatment to decrease the risk of clotting, and any other combined strategy.

In any example embodiment, the blood 106 may also be heated in a heating mode and cooled in a cooling mode by the hemofilter thermomodulator 230 to maintain the desired at least one blood flow property, and/or the coagulability.

The feedback loop includes at least data received in the controller 160 from the flow measuring device 150 and/or from one or more of the thermomodulators. The controller may rely on some or all of these data while executing at least one algorithm associated with maintaining patency of the extracorporeal blood circuit 102. The at least one algorithm will then make a determination whether the blood 106 is in a first state that calls for the temperature of the blood 106 to be increased, or a second state that calls for the temperature of the blood 106 to be decreased.

A temperature regulation scheme such as that disclosed above can be labeled "regional thermomodulation." In regional thermomodulation, the blood temperature is changed only when the blood is outside the patient 104 to reduce a risk of stagnation and/or coagulation, and the blood 106 is returned to its appropriate temperature before returning to the patient 104. During this process, modifications of temperature should be monitored and adjusted to avoid inappropriate temperature changes that can potentially cause permanent or important temporary adverse changes of blood components.

In this example embodiment, the controller 160 is in data communication 250 with the prefilter thermomodulator 224, data communication 252 with the hemofilter thermomodulator 230, and data communication 254 with the postfilter thermomodulator 240 to receive data therefrom and to send thermal regulation instructions thereto. Accordingly, the controller 160 can also control the regional thermomodulation in various areas of the extracorporeal blood circuit.

An example method associated with the thermomodulator system 222 includes performing a renal replacement therapy by passing the blood 106 in the extracorporeal blood circuit 102 through the hemofilter 108 that performs at least one of hemodialysis and hemofiltration; measuring at least one blood flow property via the flow measuring device 150; monitoring the measured at least one blood flow property; and adjusting the temperature of the blood 106 using at least one thermomodulator in response to the measured at least one blood flow property. The at least one thermomodulator is configured to heat the blood 106 when in the heating mode in response to a first state that is based at least in part on the at least one blood flow property, and to cool the blood 106 in a cooling mode in response to a second state that is based at least in part on the at least one blood flow property.

The first state is generally understood to be any situation that calls for the temperature of the blood 106 to be increased. Examples that result in a determination that the blood 106 is in the first state include: a blood hyperviscosity condition without or with a less severe hypercoagulability condition, or a state that cooling blood does not remarkably increase its coagulability, or a state in which heating is used to decrease hyperviscosity of the blood and anticoagulation is simultaneously used to decrease the likelihood of coagulation.

The second state is generally understood to be any situation that calls for the temperature of the blood 106 to be decreased. Examples that result in a determination that the blood 106 is in the second state include: A hypercoagulability condition without or with a less severe hyperviscosity condition or a state in which cooling is used to decrease hypercoagulability of the blood and pre-filter dilution with prefilter replacement fluid is simultaneously used to decrease concentration of blood within the hemofilter and thereby decreasing the resulting hyperviscosity.

In the example method, the controller 160 is configured to cause the at least one thermomodulator to heat the blood 106 in response to the first state and to cool the blood 106 in response to the second state. In the example method, the at least one thermomodulator includes: the prefilter thermomodulator 224 disposed upstream of the hemofilter 108 and configured to heat the blood in the extracorporeal circuit in the heating mode and to cool the blood in the extracorporeal circuit in the cooling mode; and the postfilter thermomodulator 240 disposed downstream of the hemofilter 108 and configured to heat the blood in the extracorporeal circuit in the heating mode and to cool the blood in the extracorporeal circuit in the cooling mode. In the example method, the at least one thermomodulator further comprises the hemofilter thermomodulator 230 disposed in the hemofilter 108 and configured to heat the blood in the extracorporeal circuit in the heating mode and to cool the blood in the extracorporeal circuit in the cooling mode.

The RRT apparatus can be programmed to conduct complex algorithms to achieve determinations and decisions based on the data received from the at least one data input device 214. For example, a change in temperature can impact hemoglobin's affinity for oxygen and affect oxygen binding capacity of the blood and oxygen delivery to the tissues and organs. To ensure that the RRT apparatus does not compromise tissue oxygenation as part of the patient safety measures, the controller 160 may be programmed to intermittently or constantly monitor oxygen saturation and delivery (through pulse oximetry, etc.) and react to untoward changes by modifying a degree of alteration of temperature by the thermomodulator system 222. Alternately, or in addition, the RRT apparatus can take other measures such as alarming the staff (nurse, intensivist, etc.) to adjust ventilator setting for better oxygenation, or if the ventilator is connected to the RRT machine as an ancillary medical device (as defined above), the controller can make modifications to the ventilator setting and notify the operator of that modification. In case of the patients who are also connected to extracorporeal membrane oxygenation (ECMO), the ECMO settings can also be modified by the RRT apparatus or by notifying the staff of a need for modification as necessary. As such, controller 160 ensures maintenance of blood oxygen at a certain desired level as a patient safety parameter as part of its monitoring of patient safety. As discussed relevant to FIG. 1 above, the controller 160 can be in communication with at least one ancillary medical device 216 such that the controller 160 is able to communicate and/or make adjustments to the ancillary medical device 216.

Even though the controller 160 is configured to follow an initial/programmed algorithm, there may be some additional unmeasured factors that at least one of: impact coagulability; result in extracorporeal circuit malfunction; deviate from safety parameter thresholds; and affect treatment adequacy (i.e. adequacy of clearance dose and/or adequacy of electrolyte and acid-base modification and/or adequacy of fluid removal rate). These factors may have not been anticipated in the algorithms and may vary from patient to patient and from one clinical circumstance to another. Therefore, as treatment time passes, the integrated artificial intelligence system can learn the impact of its administered changes on hemorheological properties (including the viscosity) and the safety and treatment adequacy parameters of the individual patient in a particular clinical scenario and adjust its future modifications of parameters accordingly. For instance, the artificial intelligence system will learn the degree of impact of heating the blood on oxygen saturation as well as the degree of impact of heating the blood on coagulability/circuit flow parameters in each individual patient in a particular clinical condition, and when necessary, modifies its algorithm for controlling the parameters accordingly. Therefore, the effects of potential known or unknown parameters and their potential interactions that had not been considered in the initial algorithm will be considered for future adjustments throughout the treatment period.

In this example embodiment, instead of an integrated unit, the flow measuring device 260 includes a flow measuring device sampler 262 at the flow measuring device location 152, and transfer tubing 264 that delivers a portion of the blood 106 to remotely disposed componentry of the flow measuring device 260 and then returns the portion of the blood 106 from the remotely disposed componentry of the flow measuring device 260. As is disclosed above, the flow measuring device 260 may alternately be an integrated unit and disposed as part of the extracorporeal blood circuit at the flow measuring device location 152 as is shown in FIG. 1. As is also disclosed above, the flow measuring device 260 may further alternately include the flow measuring device's sensor itself disposed in the extracorporeal blood circuit 102 at the flow measuring device location 152 and in data communication with the separately located processor of the flow measuring device 150 which is, in turn, in data communication with the controller 160. In each of the above embodiments, the flow measuring device location 152, or the location of its sensor or sampler, may be at the downstream end 154 of the hemofilter 108, whether before or after leaving the hemofilter 108.

In light of the above, it can be seen that the inventor has devised an improved apparatus and method for monitoring and controlling blood flow in an extracorporeal blood circuit as well as monitoring and controlling treatment adequacy parameters and patient safety parameters that represents an improvement in the art.

While various embodiments of the present invention have been shown and described herein, it will be obvious that such embodiments are provided by way of example only. Numerous variations, changes and substitutions may be made without departing from the invention herein. For example, implementation of a data input device, thermomodulator, ancillary medical device or analyzer, are alternative options. The RRT apparatus may have none or any combination of these components/systems. Accordingly, it is intended that the invention be limited only by the spirit and scope of the appended claims.

The invention claimed is:

1. A renal replacement apparatus, comprising:
a hemofilter;
an extracorporeal blood circuit configured to communicate blood from a patient, through the hemofilter, and back to the patient;
a flow measuring device configured to measure at least one blood flow property as the blood is leaving the hemofilter and before the blood returns to the patient at a flow measuring device location, wherein the flow measuring device comprises at least one of a viscometer and a rheometer;
a thermomodulator system comprising at least one thermomodulator configured to heat the blood in a heating mode and to cool the blood in a cooling mode; and
a controller in data communication with the flow measuring device;
wherein the controller is configured to monitor the measured at least one blood flow property and is configured to adjust the at least one parameter of the renal replacement apparatus in response to the measured at least one blood flow property so as to maintain at least one of patency of the extracorporeal blood circuit, treatment adequacy, and patient safety;
wherein the measured at least one blood flow property comprises viscosity;
wherein the at least one parameter of the renal replacement apparatus comprises ultrafiltration rate, dialysate rate, or blood flow rate of the renal replacement apparatus; and
wherein the controller is configured to monitor and control the at least one thermomodulator such that the controller adjusts a temperature of the blood via the at least one thermomodulator in response to the measured at least one blood flow property.

2. The renal replacement apparatus of claim 1, further comprising a post-filter replacement fluid source configured to supply post-filter replacement fluid to the blood after the blood leaves the hemofilter and before the blood returns to the patient at a post-filter replacement fluid injection location.

3. The renal replacement apparatus of claim 2, wherein the flow measuring device location is disposed in the extracorporeal blood circuit upstream of the post-filter replacement fluid injection location with respect to a direction of flow of the blood.

4. The renal replacement apparatus of claim 1, further comprising the controller being in data communication with at least one data input device and/or at least one operator input interface, and wherein the controller is further configured to adjust at least one parameter of the renal replacement apparatus in response to at least one parameter communicated by data input device and/or in response to at least one parameter communicated by operator input interface; or adjust at least one parameter of at least one ancillary medical device in communication with the controller, or a combination thereof.

5. The renal replacement apparatus of claim 4, wherein the at least one parameter further comprises any of: initiation, alteration of the rate, or termination of pre-filter replacement fluid; initiation, alteration of the rate, or termination of post-filter replacement fluid; an initiation, dose adjustment, or cessation of anticoagulation; switching between the modalities and adjusting a modality of the renal replacement apparatus, switching between different types of dialysate fluid, switching between different types of replacement fluid; or adjusting at least one parameter of the at least one ancillary medical device; or any combination thereof.

6. The renal replacement apparatus of claim 4, wherein the controller is programmed to conduct one or more algorithms to determine adjustments of the at least one parameter for maintaining at least one of the patency, treatment adequacy, and patient safety.

7. The renal replacement apparatus of claim 6, wherein the patient safety comprises at least one of the following patient safety parameters: systolic blood pressure, diastolic blood pressure, mean arterial pressure, heart rate, temperature, heart rhythm, oxygen saturation, blood gas parameters, electrocardiogram parameters, impedance monitoring parameters, ventilator settings, hematocrit, plasma electrolyte levels, coagulability indices, and weight.

8. The renal replacement apparatus of claim 6, wherein the controller utilizes artificial intelligence to determine the adjustments.

9. The renal replacement apparatus of claim 4, wherein the controller is configured to communicate with and control at least one ancillary medical device, comprising an IV infusion pump, a syringe pump, a patient's bed, a ventilator and an extracorporeal membrane oxygenation (ECMO) machine.

10. The renal replacement apparatus of claim 4, wherein the controller is configured to monitor at least one patient parameter comprising at least one of blood pressure, heart rate, respiratory rate, oxygen saturation, blood gas information, temperature, hematocrit, blood coagulability parameters, blood electrolytes, electrocardiogram data, telemetry data, ventilator settings and parameters, operator entered data, impedance monitoring data, weight monitoring data, ultrasound and echocardiogram data, and weight, and
wherein the controller is configured to adjust the at least one parameter of the renal replacement apparatus and/or at least on parameter of at least one ancillary medical device in response to the monitored at least one patient parameter.

11. The renal replacement apparatus of claim 4, wherein the controller utilizes artificial intelligence to determine the adjustments; wherein the artificial intelligence is configured to become trained about an impact of administered changes to the at least one blood flow parameter and/or at least on parameter of at least one ancillary medical device on the at least one of patency, treatment adequacy, and patient safety in a particular patient in a clinical scenario and to adjust future modifications of at least one blood flow parameter and/or at least on parameter of at least one ancillary medical device.

12. The renal replacement apparatus of claim 1, wherein the controller is configured to adjust at least one parameter of at least one ancillary medical device in communication with the controller.

13. The renal replacement apparatus of claim 1, further comprising at least one blood sampler, and at least one blood analyzer in fluid communication with the at least one blood sampler.

14. The renal replacement apparatus of claim 13 wherein the at least one blood analyzer communicates data with the controller.

15. A method, comprising:
performing a renal replacement therapy by passing blood in an extracorporeal blood circuit through a hemofilter that performs at least one of hemodialysis and hemofiltration;
measuring at least one blood flow property at a downstream end of the hemofilter via a flow measuring device, wherein the flow measuring device comprises at least one of a viscometer and a rheometer;
monitoring the measured at least one blood flow property via a controller;
controlling at least one parameter of the renal replacement therapy in response to the measured at least one blood flow property and/or in response to information the controller receives form at least one data input device in communication therewith or in response to information the controller receives from at least one operator input interface in communication therewith, wherein the at least one parameter comprises any of: an ultrafiltration rate; initiation, alteration of the rate, or termination of pre-filter replacement fluid; initiation, alteration of rate, or termination of post-filter replacement fluid; a modification of blood flow rate; an initiation, dose adjustment, or cessation of anticoagulation, altering or adjusting a modality of the renal replacement therapy, switching between different types of dialysate fluid, switching between different types of replacement fluid; or at least one parameter of an ancillary medical device in communication with the controller, or any combination thereof,
monitoring a temperature of the blood; and
adjusting the temperature of the blood in response to the measured at least one blood flow property via a thermomodulator configured to heat the blood in a heating mode and to cool the blood in a cooling mode, wherein the controller is configured to control the at least one parameter of the renal replacement therapy and to adjust the temperature of the blood, wherein controlling at least one parameter and adjusting the temperature of blood is such to maintain at least one of patency of the extracorporeal blood circuit, treatment adequacy and patient safety.

* * * * *